March 16, 1926.
T. W. SHAW
1,576,678
CEMENT MIXER
Filed March 28, 1924        2 Sheets-Sheet 1
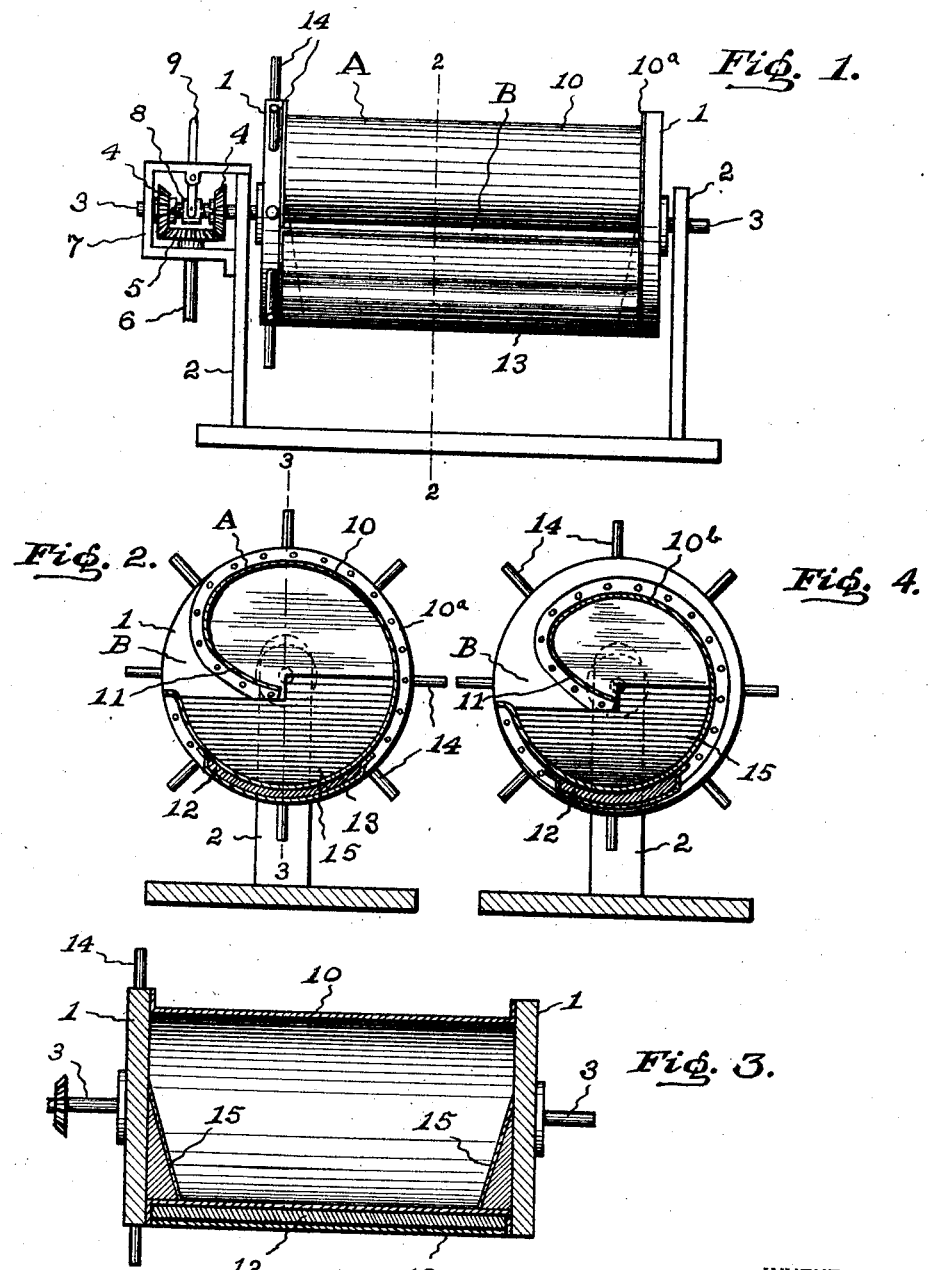
INVENTOR.
T. W. Shaw
BY
Robb Robb & Hill
ATTORNEYS

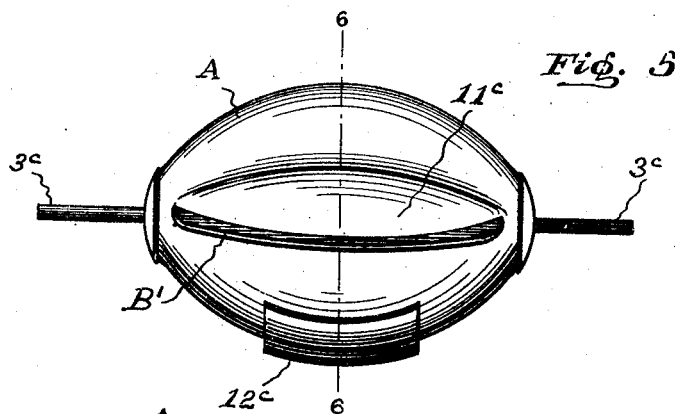
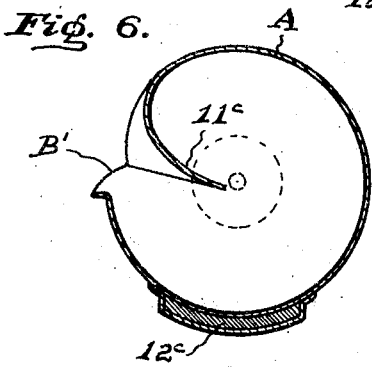
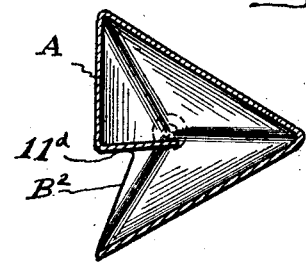
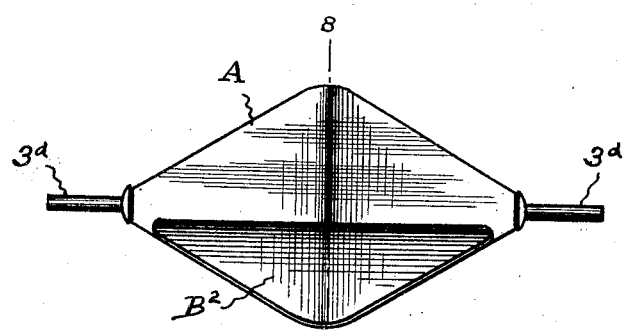
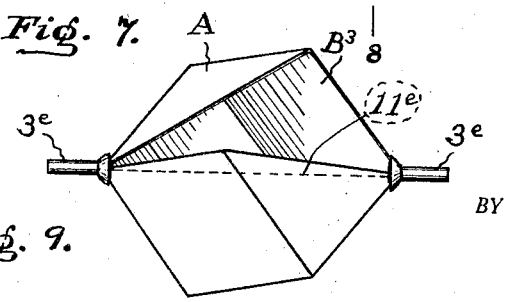

Patented Mar. 16, 1926.

1,576,678

UNITED STATES PATENT OFFICE.

THOMAS W. SHAW, OF HAYESVILLE, OHIO.

CEMENT MIXER.

Application filed March 28, 1924. Serial No. 702,538.

*To all whom it may concern:*

Be it known that I, THOMAS W. SHAW, a citizen of the United States, residing at Hayesville, in the county of Ashland and State of Ohio, have invented certain new and useful Improvements in Cement Mixers, of which the following is a specification.

The present invention relates to a mixing device and has for its object to provide a device of this character which embodies novel features of construction whereby aggregates of concrete and the like can be thoroughly agitated and mixed and then quickly discharged from the mixer for use.

Further objects of the invention are to provide a mixing machine which is comparatively simple and inexpensive in its construction, which can be easily manipulated and can either be manually driven or driven by power, and which enables the mixed materials to be quickly discharged from the mixer.

With the foregoing and other objects in view the invention consists in certain combinations and arrangements of the parts as will more fully appear as the description proceeds, the novel features thereof being pointed out in the appended claims.

For a full understanding of the invention reference is to be had to the following description and accompanying drawings, in which, Figure 1 is a side elevation of a concrete mixer, which is constructed in accordance with the invention.

Figure 2 is a transverse sectional view through the same on the line 2—2 of Figure 1.

Figure 3 is a longitudinal sectional view taken on the line 3—3 of Figure 2.

Figure 4 is a view similar to Figure 2 showing a slight modification.

Figure 5 is a side elevation of a further modification showing a form of drum which is substantially circular in cross section and tapered toward the opposite ends thereof.

Figure 6 is a transverse sectional view taken on the line 6—6 of Figure 5.

Figure 7 is a side elevation of a modified form of drum which is substantially triangular in cross section and tapers toward opposite ends.

Figure 8 is a transverse sectional view on the line 8—8 of Figure 7,

Figure 9 is a view similar to Figure 7, showing the invention as embodied in what is commonly known as a cube mixer.

Referring to Figures 1, 2 and 3 of the drawings which illustrate one of many possible embodiments of the invention, the numerals 1 designate the heads of a mixing drum A which is mounted upon the standards 2. The heads 1 are provided with stub shafts 3, which are journaled within suitable bearings in the standards 2. If it is desired power may be applied to one of the stub shafts for the purpose of rotating the drum and in order to illustrate one manner of applying power a pair of beveled pinions 4 are shown as loosely mounted upon one of the stub shafts. These pinions 4 mesh with a drive pinion 5 on a drive shaft 6 which is suitably journaled in the frame 7. The drive shaft may receive power from any suitable source, and the rotation of the drive pinion 5 causes the two pinions 4 to turn in opposite directions. A clutch member 8 is splined upon the stud shaft 3 and a shifting lever 9 is provided for moving the clutch member into engagement with either of the pinions 4, thereby enabling the mixing drum to be rotated in either direction. When the clutch member is in an intermediate position the two pinions 4 will idle on the stub shaft The drum A, in the construction shown by Figures 1, 2 and 3 of the drawing, is substantially cylindrical in shape and the peripheral wall 10 thereof may be secured to the heads 1 in any suitable manner. In the present instance the ends of the wall are shown as provided with flanges 10ª which are secured by rivets or suitable fastening members to the heads. An opening B is formed in one side of the drum and extends longitudinally thereof and at one side of the opening the edge of the peripheral wall is curved inwardly and extended toward the center of the drum, thereby providing a mixing blade 11. This mixing blade extends inwardly to substantially the center of the drum so that when the drum is rotated in one direction the mixing blade will serve to elevate the material within the drum and then drop it within the drum. This action takes place during each revolution of the drum, and the material is thereby agitated in such a manner as to be thoroughly and effectively mixed. When the material is dropped by the mixing blade it is deflected away from the opening B of the drum so that it is retained within the drum and not discharged through the opening B. After the material has been thoroughly mixed the direction of rotation of the drum is reversed and the mixed material is then discharged through the opening B. When viewing the drum in the manner illustrated on Figure 2 the drum will be rotated in a clock-wise direction during the mixing operation and then rotated in a counter-clockwise direction to discharge the same.

A weight 12 is applied to the periphery of the drum at the proper point for causing the drum to come to rest with the opening B at one side thereof and in proper position for filling. The weight 12 may be of any suitable character although for illustrative purposes it is shown as formed of heavy filling material which is confined in a space provided between the exterior of the drum and a jacket 13 which is applied to the drum. When there is no power applied to the drum it will come to rest with the weight 12 at the bottom thereof and the opening B is then positioned in an elevated position at one side of the drum. The materials to be mixed, such as gravel, sand and concrete can then be readily shoveled or thrown into the drum through the opening B and will accumulate on the portion of the inside of the drum which is just above the weight 12. After the materials to be mixed have been placed in the drum the drum is rotated in such a direction that the free edge of the opening B is advancing while the edge of the said opening which terminates in the mixing blade 11 is receding. The mixing blade 11 then elevates and drops the materials on the interior of the drum during each revolution of the drum as has been previously described. The drum may be rotated by power from some suitable source, or it may be manually rotated by suitable means such as the handles 14 which are applied to one of the heads 1. For a large size drum it would be preferable to use power for driving the same, although a small size drum might be operated in an economical and satisfactory manner by manual means.

Where the drum is substantially cylindrical in formation, as illustrated by Figures 1, 2 and 3, the heads 1 of the drum may be provided upon the inner faces thereof with the inclined walls 15. These walls are arranged so that they converge toward the side of the drum which is provided with the weight 12. When the drum is being rotated in the proper direction for discharging the contents thereof the inclined walls 15 tend to deflect the contents of the drum away from the end walls thereof just prior to the time when the opening B is brought into discharging position at the bottom of the drum. This tends to prevent the materials from being caught in the corners of the drum and hindered in their discharge.

A slight modification is shown by Figure 4, in which the peripheral wall $10^b$ of the drum has a spiral instead of a cylindrical formation. In all other respects the construction of the drum is identical with the form of the invention which has just been described. The arrangement of the wall in spiral form may serve to facilitate the mixing of the ingredients when the drum is rotated in the proper direction for producing the mixing action within the same. The weight 12 operates as in the previous instance to bring the drum to rest with the opening B in an elevated position at one side of the drum so that the materials to be mixed can be readily deposited within the drum. The arrangement of the weight is also such that it tends to act as a counterweight to balance the drum during the period of time that the contents of the drum are being lifted by the mixing blade.

A modification is shown by Figures 5 and 6, in which the drum A is tapered toward opposite ends thereof, thereby avoiding the sharp corners at the ends of the drum within which the materials to be mixed might tend to lodge. The drum is substantially circular in cross section and is provided at opposite ends thereof with the stub shafts C, upon which it is adapted to be rotatably mounted in the same manner as the drum of the construction shown by Figure 1. An opening B′ extends along one side of the drum and a mixing blade $11^c$ extends inwardly from one of the edges of the opening. This mixing blade operates exactly as in the previous instance to successively elevate and drop the materials within the drum as the drum is rotated in one direction, thereby providing for the effective mixing of the materials. When the drum is rotated in the opposite direction the materials which have been mixed will be discharged through the opening. A weight $12^c$ is shown as applied to the drum and this weight operates as in the previous instance to bring the drum to rest with the opening in an elevated position at one side thereof and also to counter-balance the drum during the period in the rotation thereof when the contents thereof are being elevated by the mixing blade.

A still further modification is shown by Figures 7 and 8, in which the drum A is tapered toward opposite ends thereof and has a polygonal cross section. The exact form of the cross section is not material and for illustrative purposes the drum is shown as having a triangular cross section and as being in form of a hexahedron. Stub shafts $3^d$ are provided at opposite ends of the drum and an opening $B^2$ is provided in one side thereof. A mixing blade $11^d$ projects inwardly from one of the edges B² and the action of this mixing blade is exactly the same as that which has been previously described. When the drum is rotated in one direction the contents of the drum will be successively elevated and dropped by the mixing blade, and in addition to this action the contents will be agitated by passing around the angular corners of the drum. The combined action of the angular corners of the drum and the mixing blade will operate in a most effective manner to agitate and mix the contents of the drum. After the contents have been thoroughly mixed they can be discharged by reversing the direction of rotation of the drum, just as in the previous instance.

Another modification is illustrated by Figure 7, in which the drum A is in the form of a cube and the stub shafts $3^d$ project from diagonally opposite corners of the cube. The mixer will thus operate in the manner of the well known cube mixer and cause the contents of the drum to zigzag back and forth around the corners of the cube as the drum is rotated. The opening $b^3$ is formed in one side of the drum and a mixing blade $11^e$ extends inwardly from one of the edges of the opening, the action of the mixing blade being exactly the same as that which has been previously described. When the drum is rotated in one direction the contents thereof will be agitated and mixed by the combined action of the mixing blade and corners of the cube, while when the drum is rotated in the opposite direction the contents thereof will be discharged through the opening $b^3$.

While certain embodiments of the invention have been shown and described in detail for illustrative purposes, it will be understood that I do not restrict myself to the exact forms of construction which have been shown and that many modifications and changes can be made in the details of construction without departing from the spirit of the invention.

Having thus described my invention what I claim as new and desire to secure by Letters Patent is—

1. A mixing device of the character described, including a hollow mixing drum having a polygonal cross section and mounted to rotate about a horizontal axis, said drum being arranged symmetrically about the axis and having a longitudinally extending opening in one side thereof, a longitudinally extending blade projecting into the drum toward the axis thereof from one of the edges of the opening so that it will successively elevate and drop the contents of the drum when the drum is rotated in one direction and cause the contents of the drum to be discharged through the opening when the drum is rotated in a reverse direction, the blade cooperating with the angular corners of the polygonal interior of the drum to mix and agitate the contents of the drum.

2. A mixing device of the character described, including a hollow mixing drum mounted to rotate about a horizontal axis, said drum being arranged symmetrically about the said axis and having a longitudinally extending opening in one side thereof, a longitudinally extending blade projecting into the drum toward the axis from one of the edges of the opening so that it will successively elevate and drop the contents of the drum when the drum is rotated in one direction and cause the contents of the drum to be discharged through the opening when the drum is rotated in a reverse direction, and a weight applied to the drum for bringing it to rest with the opening in an elevated position.

3. A mixing device including a drum which is mounted to rotate about a horizontal axis and has a polygonal cross section and is tapered toward its ends, said drum having an opening in one side thereof, and a mixing blade projecting into the drum from one of the edges of the opening for cooperation with the angular corners of the drum to agitate and mix the contents thereof when the drum is rotated in one direction, the contents being discharged through the opening when the drum is rotated in the opposite direction.

4. A mixing device including a rotatably mounted drum which has a cubical formation and is journaled on a horizontal axis extending through diagonally opposite corners thereof, said drum having an opening in one side thereof and a mixing blade projecting into the drum from one of the edges of the opening, whereby the contents of the drum will be mixed by the combined action of the mixing blade and corners of the cube when the drum is rotated in one direction and discharged through the opening when the drum is rotated in the opposite direction.

In testimony whereof I affix my signature.

THOMAS W. SHAW.